Figure 1:
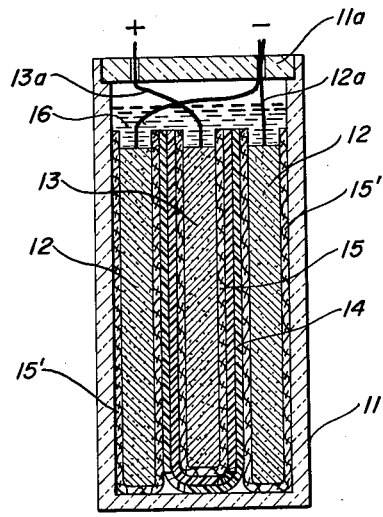

Feb. 20, 1962     C. HOROWITZ ET AL     3,022,367

SEPARATOR FOR ELECTRIC BATTERIES

Filed April 23, 1958

INVENTORS:
CARL HOROWITZ
MEYER MENDELSOHN
BY
AGENT

3,022,367
Patented Feb. 20, 1962

3,022,367
SEPARATOR FOR ELECTRIC BATTERIES
Carl Horowitz, Brooklyn, and Meyer Mendelsohn, New York, N.Y., assignors, by mesne assignments, to Yardney International Corp., New York, N.Y., a corporation of New York
Filed Apr. 23, 1958, Ser. No. 730,474
14 Claims. (Cl. 136—146)

The present invention relates to inter-electrode separators for electrochemical cells.

This application is a continuation-in-part of our application Ser. No. 469,292, filed November 16, 1954, now abandoned, for Separator for Electric Batteries.

Among materials heretofore proposed for inter-electrode separators are polyvinyl alcohol, methyl cellulose, wood, paper and regenerated cellulose. As the standards of performance for batteries were raised, these known separators no longer met all requirements for mechanical and electrical strength, electrical characteristics and length of life. The prior art has taught that separators could be constructed by placing layer upon layer of the above materials to form composites, in attempt to meet the more rigorous requirements. Each layer, however, would then maintain its individual characteristics as against the succeeding layer so that their combined resistance is the sum total of their individual resistances.

The general object of this invention is to provide a new type of separator material having low electrolytic resistance.

Another object of this invention is to provide a separator material resistant to oxidation while maintaining high electrolytic conductivity.

A further object of this invention is to provide a separator for electrochemical cells which will withstand penetration of active electrode materials while having the ability to resist attack by the oxidizing agents participating in the electrochemical reaction, at the same time exhibiting the low electrolytic resistance necessary of high-rate batteries.

Another object of this invention is to provide a rechargeable cell with a separator system having electrolytic conductivity and great oxidation resistance.

A more particular object of this invention is to provide a film-forming separator material with the aforementioned properties and capable of forming a coating on an electrochemically inert support of negligible electrolytic resistance.

We have found, in accordance with this invention, that a separator can be prepared from homogeneous mixtures of polyvinyl compounds and film-forming, electrolyte-swellable cellulose ethers (including carboxy ethers). The mixtures when cast into films, upon either temporary or permanent supports, produce separators with oxidation resistance as great as that known to the art and with extremely high electrolytic conductivity not previously associated with oxidation-resistant materials.

Among the vinyl compounds capable of forming homogeneous and uniform mixtures with the cellulose ethers are polyvinyl alcohol, polyvinyl-methyl-ether/maleic-acid copolymer (PVM/MA), polyvinylpyrrolidone and its copolymers with such substances as vinyl alcohol and vinyl acetate. The mixtures are all capable of being cast on a glass surface or the like into self-supporting films or membranes or into interfibrous films upon fibrous supports. The films are all electrolytically conductive but electronically resistant.

Films produced from the foregoing substances, and embodying the present invention, are distinguished by semi-permeability as well as structural uniformity as evidenced by resistance to gas diffusion and penetration. In addition, they possess the ability to adhere firmly to a supporting base, such as, for example, nylon fabric or felt, glass-wool mats, cellulosic sheets and fabrics, viscon casings, and webs of rayon and other electrolyte-resistant synthetics.

The film-forming ability of the homogeneous mixture embodying this invention may be further enhanced, if desired, by adding oxidation-resistant plasticizers such as, for example, glycerols or glycols, and/or anti-oxidants such as M (p-hydroxyphenyl) morpholine marketed under the trademark "Solux."

Figure 2:
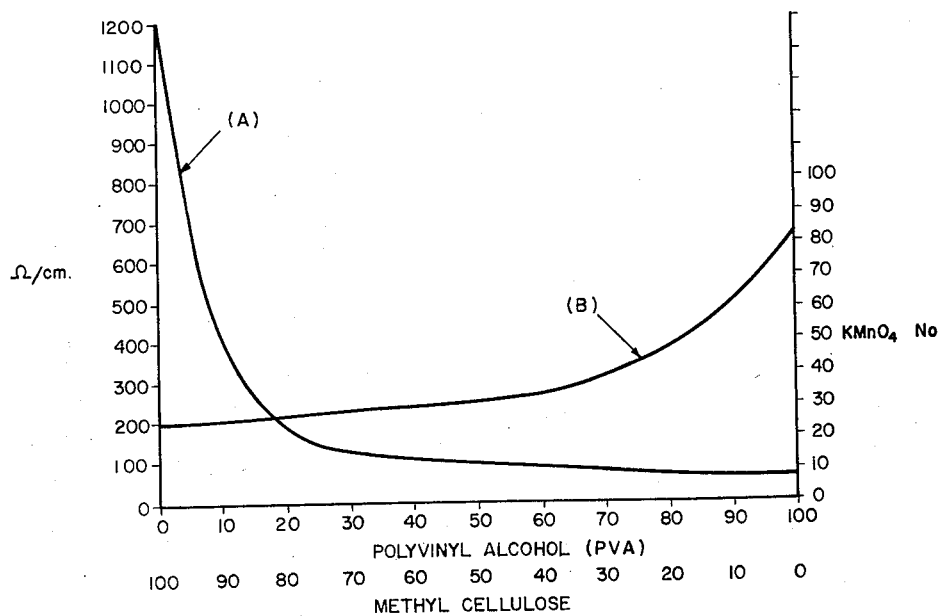

The invention will be more fully described with reference to the accompanying drawing in which:

FIG. 1 is a representation of a battery incorporating separators according to this invention; and FIG. 2 is a graphic representation of the properties of separator films compounded in accordance with this invention, plotting the electrolytic resistance and the oxidation resistance as a function of the separator composition.

FIG. 1 is a representation of a typical liquid-electrolyte cell embodying this invention, having a casing 11 and a cover 11a with a pair of negative electrodes 12 and a positive electrode 13 within the casing 11. The electrodes are separated from each other by layers of inter-electrode separator materials 14 and 15 according to this invention. The electrodes are connected to positive and negative terminals (not shown) by their respective electrode conductors 12a and 13a. The casing is filled with electrolyte to a level 16 above the tops of the electrodes. The electrodes and the separator materials are completely permeated by the electrolyte, which may be acidic, neutral or alkaline.

The separators of this invention may also be used in so-called dry cells, i.e. cells where the major portion of the liquid electrolyte is absorbed to form conductive pastes. The electrolytes in such cells may also be acidic, neutral or alkaline, and the choice of the particular separator material according to this invention is then governed by the solubility of the film-forming composition in the particular electrolyte. Among the various types of dry cells there should be included, by way of example but not for purposes of limitation, mercury cells, manganese-dioxide cells, and lead-peroxide cells.

FIG. 2 shows a representative curve for various proportions of films cast from mixtures of polyvinyl alcohol (PVA) and methyl cellulose. The polyvinyl alcohol is shown as representative of the general class of polyvinyl compounds encompassed by this invention and is not meant to limit our invention to this compound. The general shape of the curve is the same for each of the different aforementioned polyvinyl compounds with only slight differences in the numerical values. Curve A is a plot of the electrolytic resistance as a function of the methyl-cellulose content of the film. The conductivity, of course, is a reciprocal function of the resistance. Curve B is a similar plot of the permanganate number as a function of the film composition. This permanganate number is a representation of the amount of potassium permanganate needed to neutralize the reducing substances liberated by one gram of the film in a quantity of electrolyte in which the film has been soaked for 48 hours. The permanganate number provides a measure of relative oxidation resistance of the various materials used for separators. The lower the permanganate number, the greater the resistance of the material to oxidation. It will be apparent from reference to FIG. 2 that pure methyl cellulose has desirable oxidation-resistance characteristics but has too high an electrolytic resistance for use in batteries designed to supply current at medium and high rates.

It will be noted that the ratio of methyl cellulose, representing the cellulosic solids, to polyvinyl alcohol, representing the vinylic solids, can safely range between 1:3 and 3:1. Below the above-mentioned lower limit the electrolytic conductivity of the films falls rapidly and cells manufactured from such materials have intolerably high internal resistance. Similarly, above the upper limit it has been found that the oxidation number of the separator material indicates a low order of oxidation resistance which cannot safely be tolerated in electrochemical cells that must be stored or stockpiled for any considerable period of time.

*Example 1*

A viscous liquid is prepared by mixing the following ingredients:

| | Grams |
|---|---|
| Methyl cellulose, 5% aqueous solution | 100 |
| 10% aqueous solution PVM/MA | 100 |
| PVA, 10% aqueous solution | 40 |
| Diethylene glycol | 6 |
| Solux (anti-oxidant) | 0.1 |

The mixture is stirred until it is completely homogeneous. A thin layer is cast on glass and allowed to dry at room temperature for 4 hours in a current of dry air. The resulting film is stripped from the glass. A cell using this film as inter-electrode separator between a zinc negative electrode and a silver positive electrode has substantially greater cycle life than a control cell using an equivalent thickness of cellophane as the separator.

*Example 2*

The mixture of Example 1 is applied to a permeable backing such as a fabric by dipping the fabric into the solution, removing the excess by calender rolls and then drying the permeable support in a current of low-humidity air. The resulting separator, when used in a silver-zinc cell, is found to reduce the zinc-penetration rate for such cells.

*Example 3*

A mixture having the following formula:

| | Grams |
|---|---|
| 10% methyl-cellulose solution | 100 |
| 10% PVA solution | 100 |
| Diethylene glycol | 6 | is applied to a polyester-fiber fabric (Dacron by Du Pont) by dipping. The excess is removed, after impregnation is complete, by means of a blade. Dry cells are prepared using the above material in place of the conventional starch-impregnated paper. Such cells furnish higher currents with no substantial change in polarization time. In addition, the cell capacity is maintained even after prolonged storage at elevated temperature.

*Example 4*

A mixture of the following formula is applied to Dacron fabric:

| | Grams |
|---|---|
| 25% methyl-cellulose solution | 125 |
| 20% polyvinylpyrrolidone solution (average molecular weight 60,000) | 75 |

The fabric treated as above is used as an inter-electrode separator in a silver-zinc alkaline battery. The cell is then subjected to a rapid charge/discharge regime and has a much improved cycle life over that of conventional separators.

It is understood that the above examples have been cited to demonstrate general techniques and that they in no way are intended to limit the invention with respect to quantities or composition.

We claim:

1. An interelectrode separator for electrochemical cells, comprising a permeable support coated with a semi-permeable film composed of a homogeneous mixture of a polyvinyl compound, in a proportion ranging between 20% and 80% by weight of said film, with methyl cellulose.

2. An interelectrode separator for electrochemical cells, comprising a semi-permeable film composed of a homogeneous mixture of a polyvinyl compound, in a proportion ranging between 20% to 80% by weight of said film, with methyl cellulose.

3. An interelectrode separator for electrochemical cells, comprising a semi-permeable film composed of a homogeneous mixture of polyvinyl alcohol, in a proportion ranging between 20% and 80% by weight of said film, with methyl cellulose.

4. An interelectrode separator for electrochemical cells, comprising a semi-permeable film composed of a homogeneous mixture of polyvinyl-methyl-ether/maleicanhydride, in a proportion ranging between 20% and 80% by weight of said film, with methyl cellulose.

5. An interelectrode separator for electrochemical cells, comprising a semi-permeable film formed of a homogeneous mixture of polyvinyl acetate, in a proportion ranging between 20% to 80% by weight of said film with methyl cellulose.

6. An interelectrode separator for electrochemical cells, comprising a semi-permeable film formed of a homogeneous mixture of a polyvinylpyrrolidone copolymer, in a proportion ranging between 20% and 80% by weight of said film with methyl cellulose.

7. An interelectrode separator for electrochemical cells, comprising a semi-permeable film composed of a homogeneous mixture of a polyvinyl compound in a proportion ranging between 20% and 80% of said film, said compound being substantially insoluble in alkaline solutions, with methyl cellulose.

8. An interelectrode separator for electrochemical cells, comprising a semi-permeable film composed of a homogeneous mixture of a polyvinyl compound, in a proportion ranging between 20% and 80% of said film, said compound being substantially insoluble in acidic electrolytes, and methyl cellulose.

9. An electrochemical cell comprising at least one negative electrode, at least one positive electrode, an electrolyte and an interelectrode separator between said negative and positive electrodes, said separator comprising an electrolyte-permeable film composed of a homogeneous mixture of a polyvinyl compound, in a proportion ranging between 20% and 80% by weight of said film, with methyl cellulose, said compound being substantially insoluble in said electrolyte.

10. An electrochemical cell according to claim 9, wherein said separator further comprises a permeable support for said film resistant to said electrolyte.

11. An electrochemical cell according to claim 10, wherein said support comprises a porous polymeric sheet material.

12. A cell according to claim 10, wherein said support comprises a web of synthetic fibers.

13. A cell according to claim 12, wherein said fibers consist of nylon.

14. An interelectrode separator for an electrochemical device comprising a semi-permeable film composed of a homogeneous mixture of a polyvinyl compound in a proportion ranging between 20% to 80% by weight of said film and methyl cellulose, said polyvinyl compound being selected from the group consisting of polyvinyl alcohol, polyvinyl-methyl ether/maleic-acid compolymer, polyvinylpyrrolidone, polyvinylpyrrolidone-vinyl alcohol copolymers and polyvinyl alcohol-vinyl acetate copolymers.

References Cited in the file of this patent

UNITED STATES PATENTS

| 2,345,629 | Reilly | Apr. 4, 1944 |
| 2,534,336 | Cahoon | Dec. 19, 1950 |

(Other references on following page)

UNITED STATES PATENTS

| | | |
|---|---|---|
| 2,549,101 | Koch | Apr. 17, 1951 |
| 2,558,662 | Norris | June 26, 1951 |
| 2,591,755 | Wilson et al. | Apr. 8, 1952 |
| 2,635,127 | Yardney et al. | Apr. 14, 1953 |
| 2,729,694 | Ellis | Jan. 3, 1956 |
| 2,747,009 | Kirkwood et al. | May 22, 1956 |
| 2,795,009 | Gosnell et al. | June 11, 1957 |
| 2,854,338 | Herrick et al. | Sept. 30, 1958 |